June 10, 1924.  
H. E. BOWEN  
INSECT TRAP  
Filed May 14, 1923  
1,497,540
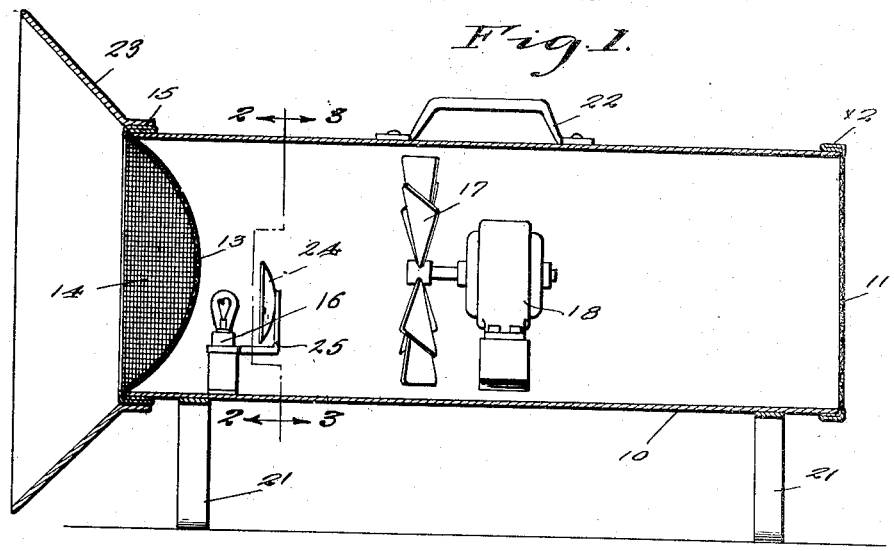
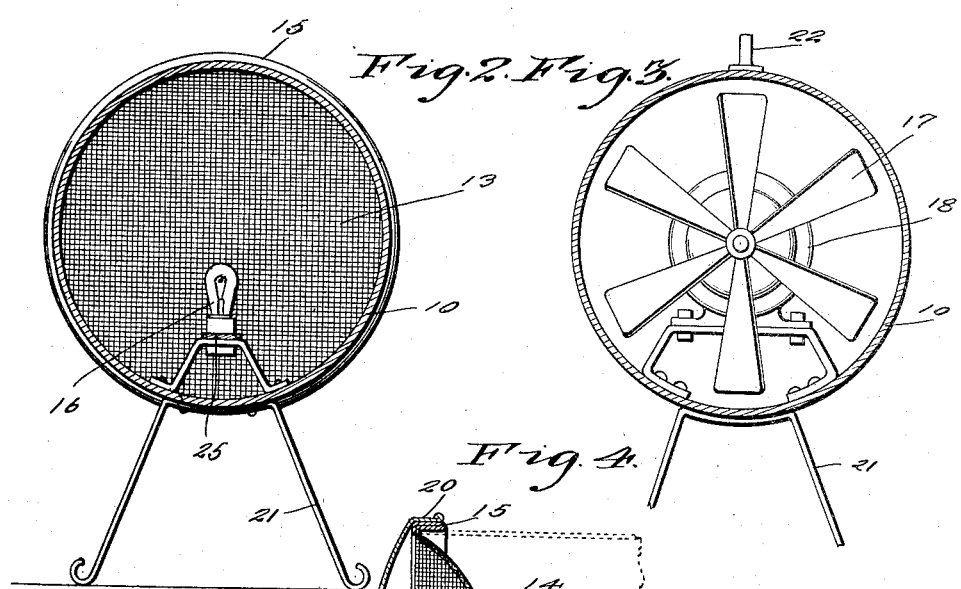
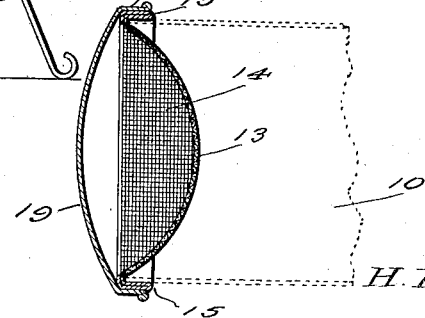
H. E. Bowen  
INVENTOR
BY Victor J. Evans  
ATTORNEY
WITNESSES Patented June 10, 1924.

1,497,540

UNITED STATES PATENT OFFICE.

HOWARD E. BOWEN, OF BALTIMORE, MARYLAND.

INSECT TRAP.

Application filed May 14, 1923. Serial No. 638,970.

*To all whom it may concern:*

Be it known that I, HOWARD E. BOWEN, a citizen of the United States, residing at Baltimore, State of Maryland, have invented new and useful Improvements in Insect Traps, of which the following is a specification.

This invention relates to improvements in traps especially designed for catching insects.

An object of the present invention is the provision of a trap which includes means whereby the insects may be attracted and drawn into the trap and disposed of in a sanitary manner.

With the above and other objects in view, the invention further includes the following novel features and details of construction, to be hereinafter more fully described, illustrated in the accompanying drawings and pointed out in the appended claims.

In the drawings:—

Figure 1 is a longitudinal sectional view of an insect trap constructed in accordance with the present invention.

Figures 2 and 3 are sectional views taken on the line 2—2 and 3—3 of Figure 1.

Figure 4 is a detail sectional view illustrating the insect receptacle.

Referring in detail to the drawings wherein like characters of reference denote corresponding parts, the reference character 10 indicates a casing of suitable size and shape, the one shown being circular in cross section. One end of this casing is closed by a reticulated end wall 11 having an annular flange 12 by means of which it may be frictionally held in place. This end wall may be removed for the purpose of obtaining access to the interior of the casing.

The opposite end of the casing is closed by a reticulated wall 13 and this last mentioned wall extends inwardly within the casing being preferably of concavo-convex formation to provide a basket-like receptacle 14. Like the wall 11, the wall 13 is provided with an annular flange 15 for frictional engagement with the end of the casing, whereby this wall may be removably engaged.

Located within the casing 10 is a lure 16 herein shown in the form of an incandescent lamp, the purpose being to provide a light which will attract insects to the basket-like end of the casing. Also located within the casing is a suction fan 17 which is driven by a motor 18, a draft being provided through the casing which will draw and hold the attracted insects against the outer face of the wall 13 and within the basket.

When it is desired to dispose of the captured insects, a cover 19 is placed over the wall 13. This cover is also of concavo-convex form and is disposed in a direction reverse from that of the wall 13. The cover is also provided with a flange 20 which frictionally engages over the flange 15. A receptacle is thus provided for the captured insects and this receptacle may be removed from the casing and the insects disposed of in a sanitary manner.

The casing is preferably mounted upon legs 21 and may be provided with a handle 22 by means of which it may be readily transported.

The casing is further provided with an outwardly flared funnel-shaped member 23, which may be secured to the flange 15 or may be removably associated therewith. In addition, the lure or lamp 16 is provided with a reflector 24 which is mounted in any suitable manner, such as a bracket 25.

The invention is susceptible of various changes in its form, proportions and minor details of construction and the right is herein reserved to make such changes as properly fall within the scope of the appended claims.

Having described the invention what is claimed is:—

1. An insect trap comprising a casing, a removable reticulated wall for the casing, a lure located within the casing for attracting insects to the reticulated wall, means whereby suction may be created through the reticulated wall and a cover detachably secured to said reticulated wall and removable therewith.

2. An insect trap comprising a casing, an inwardly extending removable reticulated wall for the casing, a lure located within the casing for attracting insects to the reticulated wall, means whereby suction may be created through the reticulated wall and a cover detachably secured to the reticulated wall and removable therewith.

3. An insect trap comprising a casing, an inwardly extending reticulated wall for the casing, a flange carried by said wall and engageable over the casing to removably hold the wall in position, a lure located within the casing for attracting insects to the reticulated wall and a cover for said wall, said cover having a concavo-convex cross sectional shape and a flange for frictional engagement with the flange of the reticulated wall to provide a removable receptacle.

In testimony whereof I affix my signature.

HOWARD E. BOWEN.